United States Patent
Kaneko et al.

(10) Patent No.: US 9,309,949 B2
(45) Date of Patent: Apr. 12, 2016

(54) VIBRATION INSULATING MEMBER

(71) Applicant: DENSO CORPORATION, Kariya, Aichi-pref. (JP)

(72) Inventors: Makoto Kaneko, Novi, MI (US); Taiki Yasuzaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 14/261,463

(22) Filed: Apr. 25, 2014

(65) Prior Publication Data

US 2014/0346719 A1 Nov. 27, 2014

(30) Foreign Application Priority Data

May 27, 2013 (JP) ................................. 2013-110838

(51) Int. Cl.
*F16F 1/44* (2006.01)
*F16F 15/08* (2006.01)
*F16F 1/376* (2006.01)

(52) U.S. Cl.
CPC ................. *F16F 15/08* (2013.01); *F16F 1/376* (2013.01)

(58) Field of Classification Search
CPC ............ F16F 15/04; F16F 15/08; F16F 1/376
USPC ........... 267/136, 153, 292, 293, 141.4, 141.5; 248/603, 638; 180/68.4, 89.2
See application file for complete search history.

(56) References Cited

U.S. PATENT DOCUMENTS

| | | | | |
|---|---|---|---|---|
| 3,350,042 A * | 10/1967 | Stewart | .................. | F16F 1/3732 267/141.4 |
| 4,306,708 A * | 12/1981 | Gassaway | ................ | F16M 7/00 248/544 |
| 4,530,491 A * | 7/1985 | Bucksbee | ............. | F16F 1/3732 267/141 |
| 4,805,868 A * | 2/1989 | Claude | ...................... | F01P 5/04 165/122 |
| 4,858,880 A * | 8/1989 | Durand | ................ | B60G 99/004 248/635 |
| 5,277,554 A * | 1/1994 | Elson | ...................... | F04B 39/00 248/638 |
| 5,609,329 A * | 3/1997 | Scholl | .................. | B60S 1/0444 267/141 |
| 5,651,535 A * | 7/1997 | David | .................. | F16F 1/3732 267/140.5 |
| 6,029,942 A * | 2/2000 | Daddis, Jr. | .......... | F04B 39/0044 248/635 |
| 6,354,558 B1 * | 3/2002 | Li | .......................... | F16F 15/08 248/615 |
| 6,394,434 B2 * | 5/2002 | Wolf | ............................. | 267/141 |
| 6,719,482 B2 * | 4/2004 | Morita | .................. | B60S 1/0444 267/141 |
| 6,758,300 B2 * | 7/2004 | Kromis | .................. | B60K 13/04 180/296 |
| 2008/0283718 A1 | 11/2008 | Tsuge | | |

FOREIGN PATENT DOCUMENTS

JP H10-318331 A 12/1998

* cited by examiner

*Primary Examiner* — Thomas J Williams
*Assistant Examiner* — Mariano Sy

(57) ABSTRACT

A vibration insulating member is equipped between one component and an other component. The vibration insulating member includes a through hole forming portion and a contact portion. The through hole forming portion is formed of an elastic material to have a through hole in which a connection member is inserted to connect the one component with the other component. The contact portion is projected radially inward from an inner wall of the through hole forming portion. The contact portion has an inner wall on a radially inside. When the connection member is inserted in the through hole, an outer wall of the connection member forms a gap with the inner wall of the through hole forming portion and is in contact with the inner wall of the contact portion.

16 Claims, 5 Drawing Sheets

VIBRATION INSULATING MEMBER

CROSS REFERENCE TO RELATED APPLICATION

This application is based on reference Japanese Patent Application No. 2013-110838 filed on May 27, 2013, the disclosure of which is incorporated herein by reference.

TECHNICAL FIELD

The present disclosure relates to a vibration insulating member configured to reduce propagation of vibration between components, which are connected via a connection member.

BACKGROUND

Conventionally, a known vibration insulating member is employed to reduce propagation of vibration from one component to another component. Patent Document 1 discloses a vibration insulating member having a through hole. In the configuration of Patent Document 1, a shaft portion of a bolt is inserted in the through hole to connect one component with another component. The vibration insulating member has an inner wall forming the through hole, and the inner wall has a thread groove. The shaft portion of the bolt has an outer wall having a thread groove. The thread groove of the bolt is meshed with the thread groove of the through hole. Patent Document 2 discloses a vibration insulating member having a through hole in which a bolt is inserted to connect one component to another component. In Patent Document 2, the through hole has an inner diameter, which is greater than an outer diameter of a shaft portion of the bolt.

(Patent Document 1)
Publication of unexamined Japanese patent application No. 2008-286246

(Patent Document 2)
Publication of unexamined Japanese patent application No. H10 -318331

It is noted that, the vibration insulating member disclosed in Patent Document 1 may require additional manufacturing work to form the thread groove in the inner wall of the through hole. Therefore, the configuration of Patent Document 1 may incur increase in manufacturing cost of the vibration insulating member. It is further noted that, the vibration insulating member disclosed in Patent Document 2 may require hard manufacturing work to position the axis of the shaft portion relative to the bolt and the axis of the through hole. In addition, a contact state between the bolt and the vibration insulating member may vary in dependent upon the relative position between the bolt and the vibration insulating member. Therefore, the configuration of Patent Document 2 may not enable to reduce vibration propagation steadily.

SUMMARY

It is an object of the present disclosure to produce a vibration insulating member configured to reduce propagation of vibration between multiple components.

According to an aspect of the present disclosure, a vibration insulating member is configured to be equipped between one component and an other component. The vibration insulating member comprises a through hole forming portion formed of an elastic material. The through hole forming portion has a through hole in which a connection member is configured to be inserted to connect the one component with the other component. The vibration insulating member further comprises at least one contact portion projected radially inward from an inner wall of the through hole forming portion. The at least one contact portion has an inner wall on its radially inside. When the connection member is inserted in the through hole, an outer wall of the connection member forms at least one gap with the inner wall of the through hole forming portion and is in contact with the inner wall of the at least one contact portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

(First Embodiment)

Figure 1:
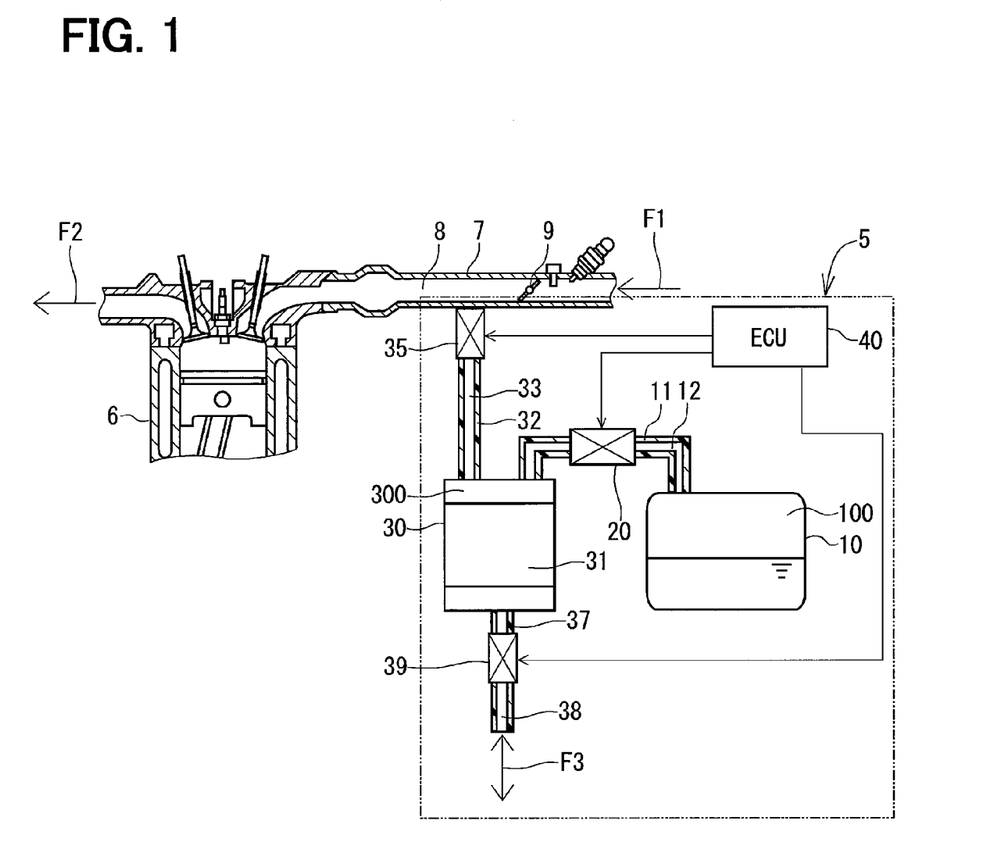
FIG. 1 is a schematic diagram showing a vapor fuel processing system including a vibration insulating member according to a first embodiment of the present disclosure.

FIG. 1 shows a vapor fuel processing system, which employs a vibration insulating member according to a first embodiment of the present disclosure.

A vapor fuel processing system 5 includes a fuel tank 10, a tank sealing valve 20, a canister 30, a purge valve 35, an electronic control unit (ECU) 40, and/or the like. In the vapor fuel processing system 5, the canister 30 recovers fuel vapor arising in the fuel tank 10. The canister 30 purges recovered fuel vapor into an intake passage 8. The intake passage 8 is formed in an intake pipe 7, which is connected to an internal combustion engine 6. In FIG. 1, the arrows F1, F2, and F3 represent a flow of intake air drawn into the engine 6, a flow of exhaust gas exhausted from the engine 6, and a flow of air drawn into the canister 30 or drawn from the canister 30, respectively.

The fuel tank 10 is connected with the canister 30 through a purge pipe 11. The fuel tank 10 stores fuel to be supplied to the engine 6. The purge pipe 11 forms a purge passage 12. The purge passage 12 is configured to communicate an interior 100 of the fuel tank 10 with an interior 300 of the canister 30. The purge pipe 11 is equipped with the tank sealing valve 20. The tank sealing valve 20 is configured to communicate the interior 100 of the fuel tank 10 with the interior 300 of the canister 30 and to block the interior 100 of the fuel tank 10 from the interior 300 of the canister 30 according to an instruction from the ECU 40. The configuration of the tank sealing valve 20 will be described later.

The canister 30 includes a canister adsorption material 31, which is configured to recover fuel vapor arising in the interior 100 of the fuel tank 10. The canister 30 is connected with the intake pipe 7 through a purge pipe 32, which forms a purge passage 33. The purge pipe 32 is equipped with the purge valve 35. The purge valve 35 is configured to communicate the interior 300 of the canister 30 with the intake passage 8 of the intake pipe 7 and to block the interior 300 of the canister 30 from the intake passage 8 of the intake pipe 7 according to an instruction from the ECU 40. The canister 30 is connected with an atmospheric air pipe 37. The atmospheric air pipe 37 forms an atmospheric air passage 38, which is configured to communicate the interior 300 of the canister 30 with the atmosphere. The atmospheric air pipe 37 is equipped with an atmospheric air valve 39. The atmospheric air valve 39 is configured to communicate the interior 300 of the canister 30 with the atmosphere and to block the interior 300 of the canister 30 from the atmosphere according to an instruction from the ECU 40.

The ECU 40 includes a microcomputer, which is configured with a CPU as a computation unit, a RAM and a ROM as a storing unit, and/or the like. The ECU 40 is electrically connected with the tank sealing valve 20, the purge valve 35, the atmospheric air valve 39, and/or the like. The ECU 40 is configured to open and close the tank sealing valve 20 according to a traveling state of a vehicle, thereby to control communication between the interior 100 of the fuel tank 10 and the interior 300 of the canister 30. The ECU 40 is further configured to open and close the purge valve 35 and the atmospheric air valve 39 according to the traveling state of the vehicle. The present configuration enables fuel, which is adsorbed in the canister adsorption material 31, to be entrained with atmospheric air, which flows through the atmospheric air passage 38 into the interior 300 of the canister 30. Thus, the present configuration enables the entrained fuel to be supplied through the purge passage 33 into the intake passage 8, which is on the downstream of a throttle valve 9.

Figure 3:
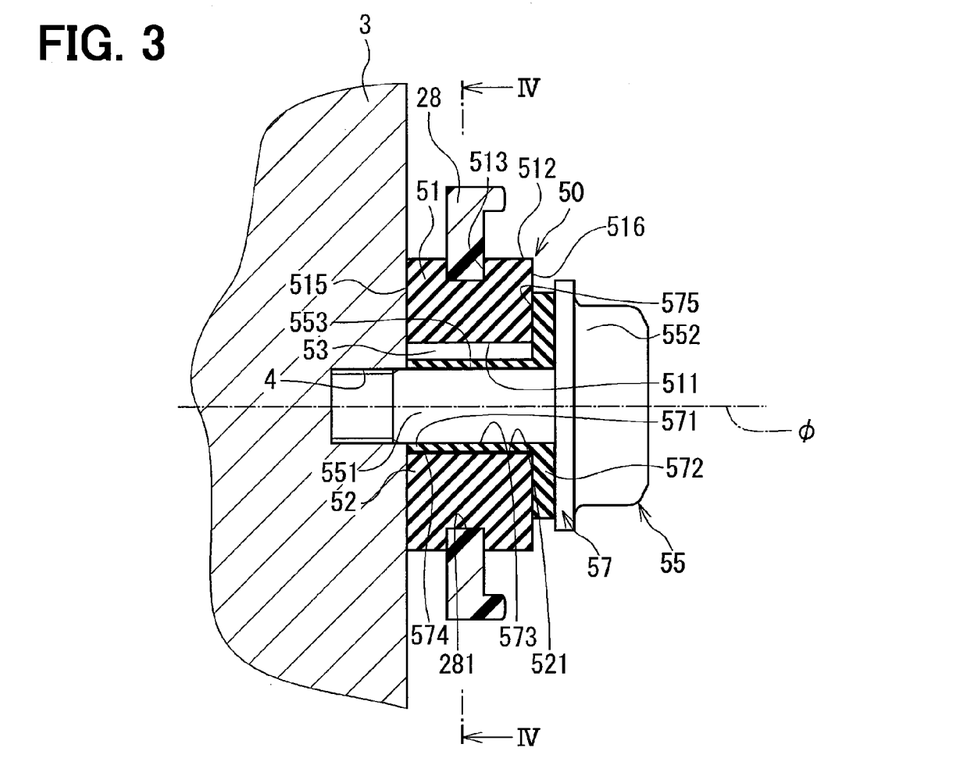
FIG. 3 is a sectional view showing the vibration insulating member according to the first embodiment of the present disclosure.
Figure 4:
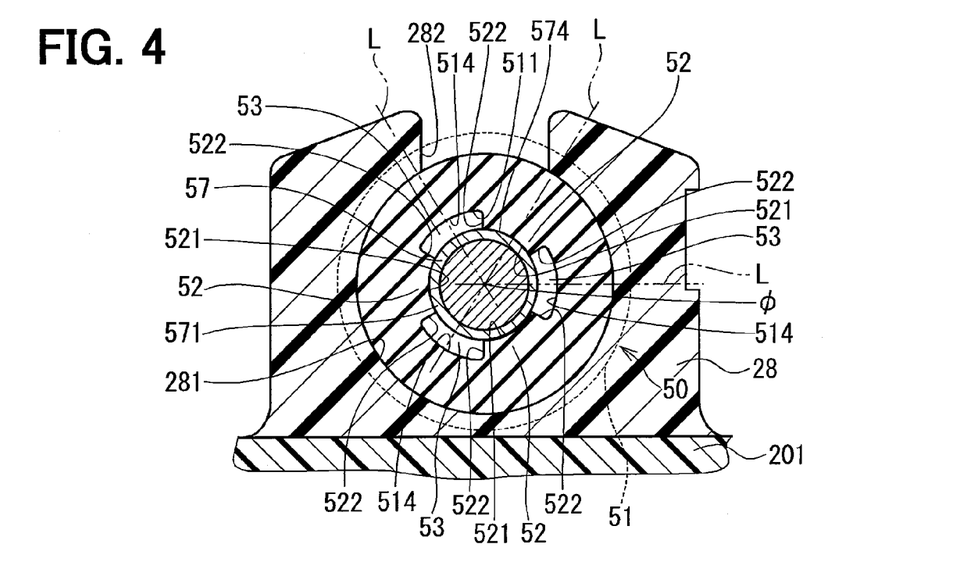
FIG. 4 is a sectional view taken along a line IV-IV in FIG. 3.

Subsequently, the configuration of the tank sealing valve 20 will be described with reference to FIGS. 2 to 4.

The tank sealing valve 20 includes a housing 200, a solenoid actuator 21, a valve unit 24, a joint portion 27, a mount portion 28, and/or the like. The tank sealing valve 20 is a solenoid valve. The tank sealing valve 20 is mounted to, for example, a frame 3 of the vehicle (FIG. 3) via the mount portion 28 by using a bolt 55, a collar 57, and a grommet 50. At least one of the bolt 55, the collar 57, and the grommet 50 may function as a connection member. The frame 3 of the vehicle may be one example of another component. The tank sealing valve 20 is configured to cause the solenoid actuator 21 to generate a driving force to open the valve unit 24. In this way, the tank sealing valve 20 communicates the interior 100 of the fuel tank 10 with the interior 300 of the canister 30 through the joint portion 27 and the valve unit 24. The tank sealing valve 20 may be one example of a one component.

The housing 200 includes a first housing 201, a second housing 202, and/or the like. The first housing 201 is located on the left side in FIG. 2. The first housing 201 accommodates the solenoid actuator 21 and/or the like. The second housing 202 is located on the right side in FIG. 2. The second housing 202 accommodates the valve unit 24 and/or the like.

The solenoid actuator 21 includes a stationary core 22, a spring 221, a moving core 23, a coil 222, and/or the like. In the solenoid actuator 21, the moving core 23 is attracted toward the stationary core 22 when electricity is supplied to the coil 222.

The stationary core 22 is substantially in a tubular shape and is fixed to the first housing 201. The stationary core 22 includes a guide portion 223 and an attracting portion 224, which are integrally formed with each other. The guide portion 223 guides the moving core 23 to enable the moving core 23 to move in the axial direction. The attracting portion 224 is configured to generate a magnetic attractive force to attract the moving core 23. The stationary core 22 accommodates a retention member 225, which retains one end of the spring 221.

The spring 221 is retained by the moving core 23 at the other end. The spring 221 biases a first valve element 25 of the valve unit 24 via the moving core 23. The spring 221 biases the first valve element 25 in a direction in which the first valve element 25 makes contact with a pressure-receiving member 262 of the second valve element 26 of the valve unit 24. The spring 221 is adjusted to generate a biasing force at a predetermined value. Specifically, the spring 221 is configured such that the first valve element 25 is not lifted from the pressure-receiving member 262, when electricity is not supplied to the coil 222 and even in a case where a pressure in the fuel tank 10 becomes a negative pressure.

The coil 222 is wound around a bobbin 227 to surround an outer circumferential periphery of the stationary core 22. The coil 222 is electrically connected with an end terminal 204 to receive driving electricity from an external device. The end terminal 204 is equipped to a terminal 203. A yoke 228 magnetically connects the guide portion 223 of the stationary core 22 with the attracting portion 224 through an outer circumferential periphery of the coil 222.

The valve unit 24 includes the first valve element 25, a second valve element 26, a valve seat 261, and/or the like. The valve unit 24 is accommodated in a valve chamber 240. The valve chamber 240 is formed in the second housing 202.

The first valve element 25 includes a shaft 251 and a bellows 252. The shaft 251 is movable in an axial direction of the tank sealing valve 20. The shaft is connected to the moving core 23 at one end. The other end of the shaft 251 is connected with a contact portion 254 of the bellows 252. The other end of the shaft 251 is inserted in a through hole 264 of the pressure-receiving member 262. The shaft 251 has a small diameter portion 253 at the other end, which is inserted in the through hole 264. The small diameter portion 253 has a relatively small outer diameter. The shaft 251 changes its position relative to the through hole 264 in conjunction with movement of the moving core 23 back and forth. The bellows 252 is a resin member having an accordion-like flexible structure.

The bellows 252 is closed at one end. The other end of the bellows 252 has an opening. The other end of the bellows 252 is fixed between the first housing 201 and the second housing 202. The bellows 252 has the one end, which is on the opposite side of the other end, which is fixed between the first housing 201 and the second housing 202. The one end of the bellows 252 has a through hole substantially at its center. The shaft 251 is inserted in the through hole and is fixed to the bellows 252.

The second valve element 26 includes the pressure-receiving member 262, a spring 263, and/or the like. The pressure-receiving member 262 is a metallic member, which is substantially in a tubular shape. The pressure-receiving member 262 is located on the opposite side of the first valve element 25 from the moving core 23. The pressure-receiving member 262 has an end surface 265 on the side of the first valve element 25. The end surface 265 is formed substantially in a plane shape and is configured to contact with the contact portion 254 of the bellows 252. The pressure-receiving member 262 has an end surface 266 on the opposite side of the first valve element 25. The end surface 266 is formed in a step shape, i.e., stair-like shape. The pressure-receiving member 262 has the through hole 264. The through hole 264 extends substantially through the center of the pressure-receiving member 262.

The spring 263 is retained at one end on the end surface 266 of the pressure-receiving member 262. The spring 263 is further retained at the other end on the inner wall of the second housing 202. The spring 263 biases the pressure-receiving member 262 in a direction in which the pressure-receiving member 262 makes contact with the contact portion 254. The biasing force of the spring 263 is smaller than the biasing force of the spring 221. Therefore, when electric power is not supplied to the coil 222, the end surface 266 of the pressure-receiving member 262 is in contact with the valve seat 261, and the contact portion 254 of the bellows 252 is in contact with the end surface 265 of the pressure-receiving member 262.

The valve seat 261 is formed on a periphery of the second connection passage 274, which forms an opening on the side of the second housing 202. The valve seat 261 is configured to make contact with the end surface 266 of the pressure-receiving member 262 and to move away from the end surface 266 of the pressure-receiving member 262.

The joint portion 27 includes a first connecting pipe 271 and a second connecting pipe 272. The joint portion 27 is connected with the second housing 202 and located on the opposite side from a portion at which second housing 202 is connected with the first housing 201. As shown in FIG. 2, the first connecting pipe 271 is connected with an outer wall of the second housing 202, which forms the valve chamber 240. The first connecting pipe 271 forms a first connection passage 273. The first connection passage 273 communicates the interior 100 of the fuel tank 10 with the valve chamber 240.

Figure 2:
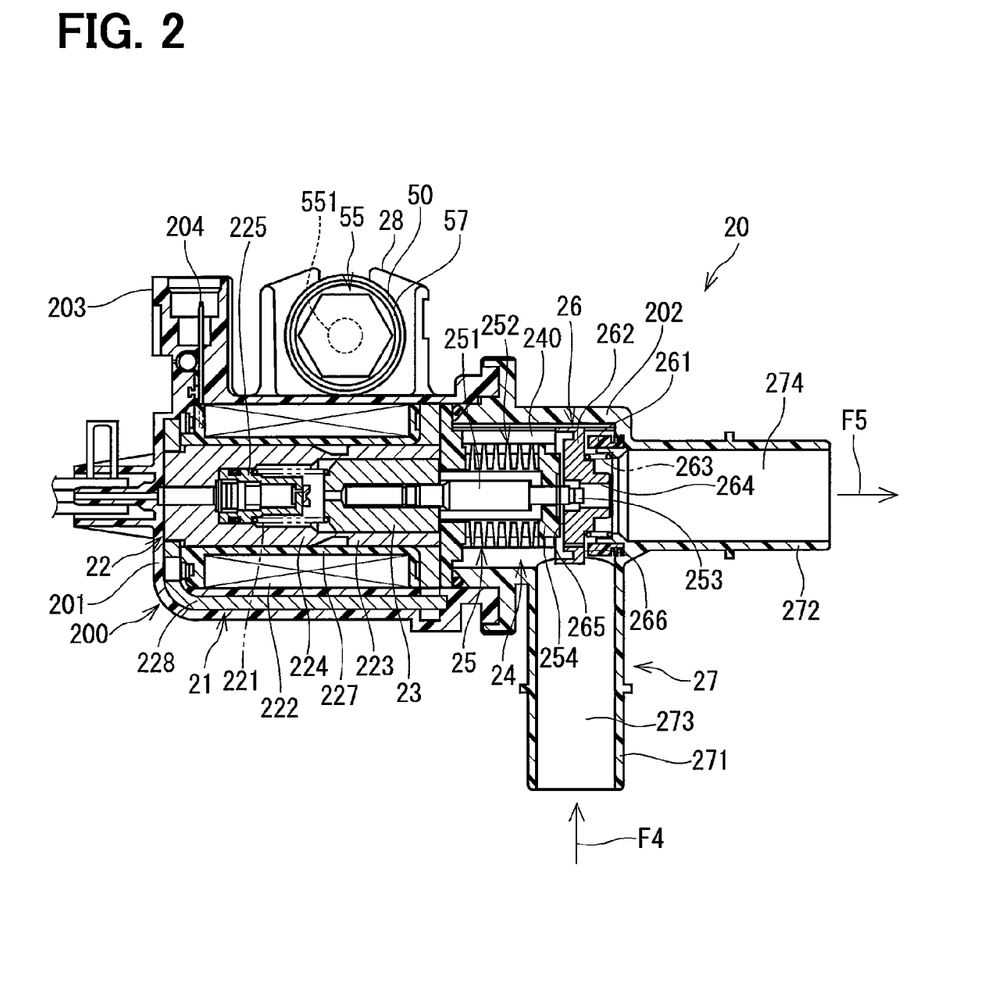
FIG. 2 is a sectional view showing a tank sealing valve for the vapor fuel processing system including the vibration insulating member according to the first embodiment of the present disclosure.

As shown in FIG. 2, the second connecting pipe 272 is connected with the outer wall of the second housing 202, which forms the valve chamber 240. The second connecting pipe 272 is connected with the outer wall at a different position from the position at which the first connecting pipe 271 is connected with the outer wall. The second connecting pipe 272 forms a second connection passage 274. The second connection passage 274 communicates the interior 300 of the canister 30 with the valve chamber 240. In FIG. 2, an arrow F4 represents a flow or fuel vapor of air, which flows from the interior 100 of the fuel tank 10 through the first connection passage 273 into the valve chamber 240. An arrow F5 represents a flow of fuel vapor or air, which flows from the valve chamber 240 through the second connection passage 274 into the canister 30.

The mount portion 28 is formed substantially in a plate shape. The mount portion 28 is equipped to an outer wall of the first housing 201. As shown in FIGS. 3 and 4, the mount portion 28 has a through hole 281 at its center. The through hole 281 is equipped with the grommet 50. As shown in FIG. 4, a communication passage 282 is formed to communicate the through hole 281 with an exterior of the through hole 281. The communication passage 282 extends in a direction substantially perpendicular to a center axis of the through hole 281. The communication passage 282 is configured to function as a passage to enable the grommet 50 to pass through when the grommet 50 is mounted to the mount portion 28.

The grommet 50 includes a through hole forming portion 51 and multiple contact portions 52. The grommet 50 is integrally formed of an elastic material, such as rubber, substantially into a tubular shape. The grommet 50 is equipped between the frame 3 of the vehicle and the tank sealing valve 20. The grommet 50 may function as the vibration insulating member.

The through hole forming portion 51 is formed in a tubular shape to have a through hole 511 at its center in the axial direction. The bolt 55 and the collar 57 are inserted in the through hole 511. The through hole forming portion 51 has a stationary groove 513, which is in a concaved shape. The stationary groove 513 is formed on an outer wall 512 of the through hole forming portion 51, which is located radially outside of the through hole forming portion 51. The stationary groove 513 extends in a circumferential direction. The mount portion 28 is inserted in the stationary groove 513.

The contact portion 52 is formed to be projected radially inward from an inner wall 514 of the through hole forming portion 51. The contact portion 52 is formed to extend in the axial direction from an end surface 515 of the through hole forming portion 51 to an end surface 516 of the through hole forming portion 51. The end surface 515 is located on the side of the frame 3 of the vehicle. The end surface 516 is located on the opposite side of the frame 3 of the vehicle. As shown in FIG. 4, the grommet 50, which is employed in the tank sealing valve 20 according to the first embodiment, has three contact portions 52. When the collar 57 and the bolt 55 are inserted into the through hole 511, an outer wall 574 of the collar 57 makes contact with an inner wall 521 of the contact portion 52. The outer wall 574 is located on the radially outside of the collar 57. The inner wall 521 is located on the radially inside of the contact portion 52. In the present state, the outer wall 574 located on the radially outside of the collar 57, the inner wall 514 of the through hole forming portion 51, and sidewalls 522 of the projections 52 in the circumferential direction form multiple gaps 53. The end surface 515 may be equivalent to another (an other) end surface. The end surface 516 may be equivalent to one end surface.

Gaps 53 are formed to extend from the end surface 515 to the end surface 516 along a center axis φ of the through hole 511. The gap 53 has a sectional shape perpendicular to the center axis φ, and the sectional shape is substantially symmetrical about an imaginary line L as an axis of symmetry. The imaginary line L passes through a point on the center axis φ. The gaps 53 are formed on a concentric circle centered at a point on the center axis φ. The gaps 53 are formed such that gaps 53, which are adjacent to each other, are arranged at a constant angular interval. Specifically, the vapor fuel processing system 1 according to the first embodiment has three gaps 53. Centers of gaps 53, which are adjacent to each other, are at an angular distance of 120 degrees from each other, relative to a point on the center axis φ.

The collar 57 includes a body 571 and a seat portion 572. The body 571 and the seat portion 572 are integrally formed of a material. The material of the body 571 and the seat portion 572 has a compressive strength higher than a compressive strength of the elastic material of the grommet 50. The body 571 may be formed of, for example, a metallic material. The body 571 is formed in a tubular shape. The length of the body 571 is slightly shorter than the length of the through hole 511 of the grommet 50 in the axial direction. The seat portion 572 is formed in an annular shape. The seat portion 572 is located at an end of the body 571 on the opposite side of the frame 3 of the vehicle. The collar 57 has a through hole 573 at its center. When a shaft portion 551 of the bolt 55 is inserted into the through hole 573, an outer wall 553 of the shaft portion 551 makes contact with the inner wall of the body 571. In this way, the outer wall 553 of the shaft portion 551 of the bolt 55 makes contact with the inner wall 521 of the contact portion 52 via the collar 57. In addition, an end surface 575 of the seat portion 572 on the side of the grommet 50 makes contact with the end surface 516 of the grommet 50. The end surface of the seat portion 572 on the opposite side of the grommet 50 makes contact with a head 552 of the bolt 55.

The bolt 55 includes the shaft portion 551 and the head 552. The shaft portion 551 has a thread groove at the outer wall of its tip end. The bolt 55 is inserted together with the collar 57 into the through hole 511 of the grommet 50. Thus, the bolt 55 is screwed into and combined with a thread groove 4 formed in the frame 3. In the present configuration, the frame 3 and the tank sealing valve 20 are connected with each other to interpose the grommet 50 therebetween.

Subsequently, an operation of the tank sealing valve 20 will be described. When electric power is not supplied to the coil 222, the first valve element 25 is applied with the biasing force of the spring 221 and biased toward the second valve element 26. In the present state, the contact portion 254 of the bellows 252 is in contact with the end surface 265 of the pressure-receiving member 262. In addition, the end surface 266 of the pressure-receiving member 262 is in contact with the valve seat 261. Thus, the first connection passage 273 is blocked from the second connection passage 274.

When electric power is supplied to the coil 222, the moving core 23 is attracted toward the attracting portion 224 of the stationary core 22 against the biasing force of the spring 221. Thus, the first valve element 25 moves together with the moving core 23 toward the stationary core 22. In addition, the contact portion 254 of the bellows 252 moves away from the end surface 265 of the pressure-receiving member 262. Vapor fuel caused in the interior 100 of the fuel tank 10 flows through the purge passage 12, the first connection passage 273, and the valve chamber 240. The vapor fuel further flows through the gap, which is formed between the shaft 251 and the pressure-receiving member 262, and the second connection passage 274. Thus, the vapor fuel flows into the canister 30. In an initial state immediately after the contact portion 254 moves away from the pressure-receiving member 262, vapor fuel starts flowing from the first connection passage 273 into the second connection passage 274. In the initial state, a quantity of vapor fuel, which flows from the first connection passage 273 into the second connection passage 274, depends on the size of the gap between the small diameter portion 253 of the shaft 251 and the inner wall of the through hole 264.

When the first valve element 25 moves further toward the stationary core 22, most of the small diameter portion 253 of the shaft 251 is pulled out of the through hole 264. When the size of the gap between the small diameter portion 253 of the shaft 251 and the inner wall of the through hole 264 becomes large, difference between pressure in the first connection passage 273 and pressure in the second connection passage 274 decreases. Thus, the force exerted onto the pressure-receiving member 262 toward the valve seat 261 decreases. The pressure-receiving member 262 is moved away from the valve seat 261 by application of the biasing force of the spring 263. Thus, the pressure-receiving member 262 is moved toward the first valve element 25. In this way, vapor fuel flows from the first connection passage 273 directly into the second connection passage 274, without passing through the gap between the small diameter portion 253 of the shaft 251 and the inner wall of the through hole 264.

(a) In the vapor fuel processing system 1, when the stationary core 22 attracts the moving core 23 in the solenoid actuator 21, the moving core 23 slides on the guide portion 223 and moves. In the present state, oscillation occurs in the solenoid actuator 21. The vapor fuel processing system 1 according to the first embodiment includes the grommet 50, which is configured to restrain transmission of oscillation between the frame 3 of the vehicle and the tank sealing valve 20. The bolt 55 is screwed to combine the frame 3 with the tank sealing valve 20 of the vehicle. In the present state, the grommet 50 is interposed between the frame 3 of the vehicle and the mount portion 28 of the tank sealing valve 20. Thus, the grommet 50 is elastically deformed. In the present state, the grommet 50 is enabled to deform by utilizing the gap 53 formed between the collar 57 and the grommet 50. The present configuration enables to suppress reduction in elasticity compared with a configuration employing a grommet, in which the inner wall of the through hole is in contact with the outer wall of the bolt or the outer wall of the color entirely in the circumferential direction. Therefore, the present configuration enables to suppress oscillation transmitted between the frame 3 of the vehicle and the tank sealing valve 20 efficiently.

(b) The contact portion 52 of the grommet 50 is in contact with the outer wall 553 of the shaft portion 551 of the bolt 55 via the collar 57. The present configuration enables to facilitate positioning of the bolt 55 relative to the center axis φ of the through hole 511. Therefore, the present configuration enables to facilitate control of a contact state between the bolt 55 and the contact portion 52. Thus, the grommet 50 is configured to produce a vibration proof property steadily.

(c) The tank sealing valve 20 according to the first embodiment includes the collar 57, which is formed of a metallic material and is equipped between the grommet 50 and the bolt 55. The collar 57 has the compressive strength higher than the compressive strength of the elastic material of the grommet 50. Therefore, even when the bolt 55 is screwed to the frame 3 of the vehicle according with high screwing force, the collar 57 is protected from damaging. Thus, the present configuration enables to restrict the bolt 55 from being loosened due to, for example, oscillation, while also protecting the grommet 50 from breakage.

(Second Embodiment)

Subsequently, a vibration insulating member according to the second embodiment of the present disclosure will be described with reference to FIGS. 5 and 6. The second embodiment is different from the first embodiment in that the head of the bolt is directly in contact with the grommet.

Figure 5:
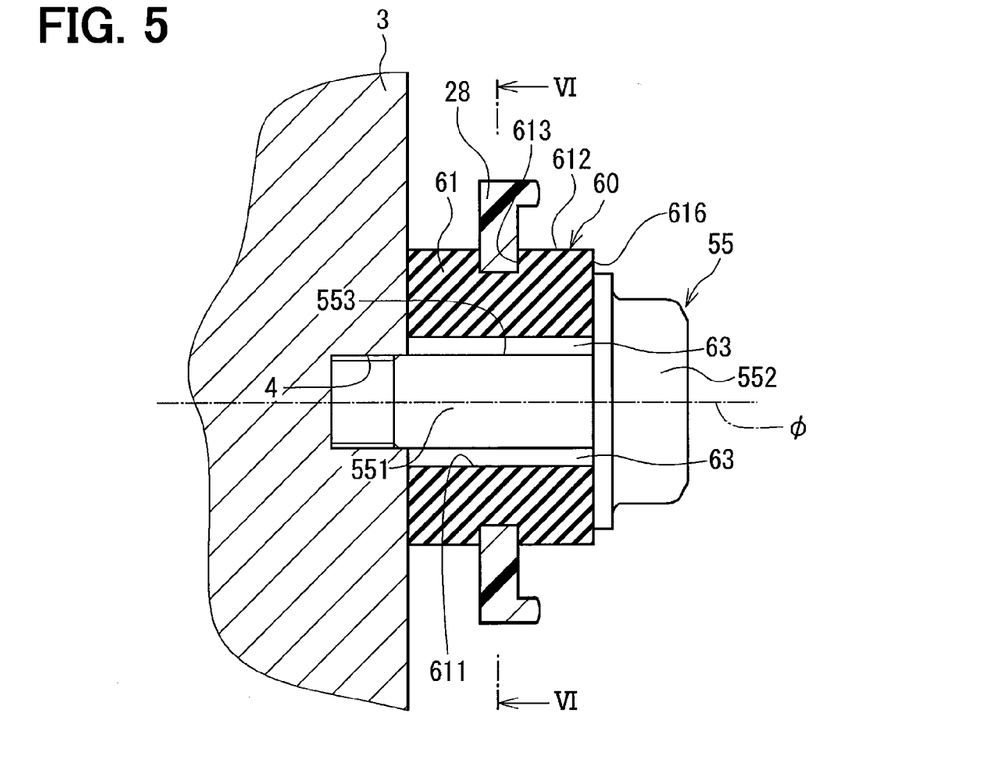
FIG. 5 is a sectional view showing a vibration insulating member according to a second embodiment of the present disclosure.
Figure 6:
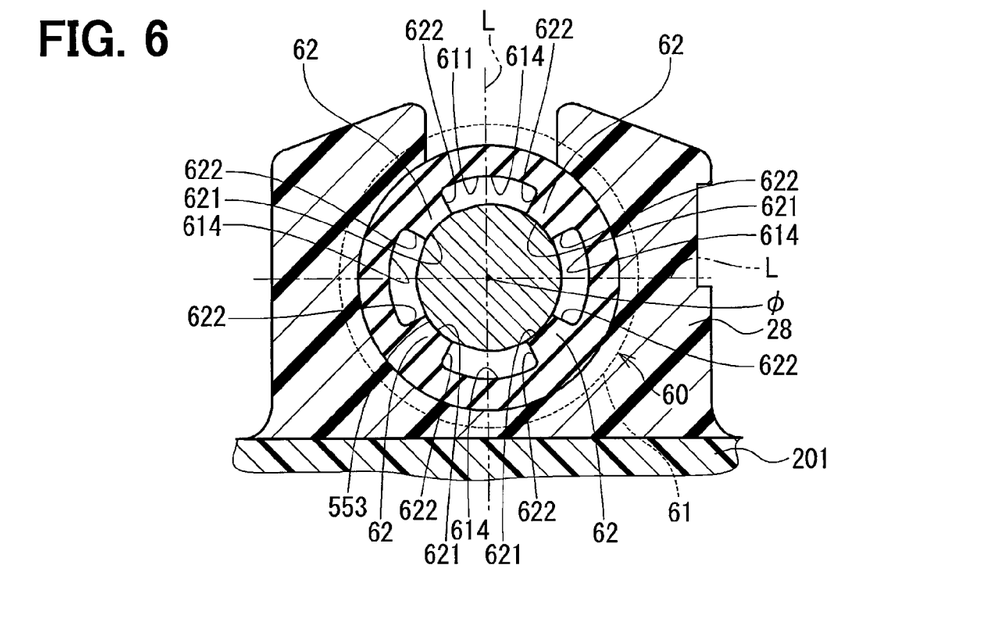
FIG. 6 is a sectional view taken along a line V-V in FIG. 5.

As shown in FIG. 5, in the vapor fuel processing system according to the second embodiment, the frame 3 of the vehicle is connected with the mount portion 28 of the tank sealing valve 20 by using the bolt 55 and a grommet 60. The grommet 60 may function as a vibration insulating member.

The grommet 60 includes a through hole forming portion 61 and four contact portions (projection) 62. The through hole forming portion 61 has a through hole 611 at its center in the axial direction. The shaft portion 551 of the bolt 55 is inserted into the through hole 611. The through hole forming portion 61 has an outer wall 612 on the radially outside. The outer wall 612 has a stationary groove 613, which is in a concave shape. The stationary groove 613 extends in the circumferential direction. The mount portion 28 of the tank sealing valve 20 is inserted in the stationary groove 613. The through hole forming portion 61 of the grommet 60 has an end surface 616 on the opposite side of the frame 3. The end surface 616 is in contact with the head 552 of the bolt 55.

The contact portion 62 is formed to be projected radially inward from an inner wall 614 of the through hole forming portion 61. As shown in FIG. 6, the grommet 60 employed in the vapor fuel processing system according to the second embodiment includes four contact portions 62. When the bolt 55 is inserted in the through hole 611, the outer wall 553 of the shaft portion 551 of the bolt 55, which is located on the radially outside, makes contact with an inner wall 621 of the contact portion 62, which is located on the radially inside. In the present state, the outer wall 553 of the shaft portion 551 of the bolt 55, the inner walls 614 of the through hole forming portion 61, and a sidewalls 622 of the projection 62 each located on the side in the circumferential direction, form four gaps 63 thereamong.

Each of the gaps 63 has a sectional shape perpendicular to the center axis φ of the through hole 611, and the sectional shape is substantially symmetrical about an imaginary line L as an axis of symmetry. The imaginary line L passes through a point on the center axis φ. The gaps 63 are formed on a concentric circle centered at a point on the center axis φ. The gaps 63 are formed such that gaps 53, which are adjacent to each other, are arranged at a constant angular interval. Specifically, the vapor fuel processing system according to the second embodiment has the four gaps 63. Centers of the gaps 63, which are adjacent to each other, are at an angular distance of 90 degrees from each other, relative to a point on the center axis φ.

In the vapor fuel processing system of the second embodiment, the frame 3 of the vehicle is connected with the tank sealing valve 20, without the collar of the first embodiment. The present configuration enables to produce the effects (a) and (b) of the first embodiment.

(Other Embodiments)

(I) In the above embodiments, the grommet is equipped as the vibration insulating member between the frame of the vehicle and the tank sealing valve. It is noted that, the position where the vibration insulating member is equipped is not limited to the above examples. The vibration insulating member may be applied to various purposes and may be equipped to various locations between multiple members, which are connect to each other, to restrain propagation of oscillation between the members.

(II) According to the first embodiment, the shaft portion of the bolt and the inner walls of the through hole forming portion of the grommet form the three gaps therebetween. According to the second embodiment, the shaft portion and the inner walls of the through hole forming portion form the four gaps therebetween. It is noted that, the number of the gaps is not limited to those in the above-described examples. The number of the gaps may be equal to or greater than five or may be one.

(III) In the above embodiments, each gap is formed to extend in the axial direction from the end surface of the through hole forming portion on the side of the frame of the vehicle to the end surface of the through hole forming portion on the opposite side of the frame of the vehicle. It is noted that, the length of the gap in the axial direction is not limited to that in the above-described examples. The gap may have a length partially from the one end surface of the through hole forming portion to the other end surface of the through hole forming portion.

(IV) In the above embodiments, the gap has the sectional shape, which is perpendicular to the center axis of the through hole, and the sectional shape is substantially symmetrical about the imaginary line as the axis of symmetry. The imaginary line passes through the point on the center axis of the through hole. It is noted that, the position of the gap is not limited to that in the above examples.

(V) In the above embodiments, the gaps are formed on the concentric circle centered at the point on the center axis. In addition, the gaps are formed such that gaps, which are adjacent to each other, are arranged at the constant angular interval. It is noted that, the positions of the gaps are not limited to those in the above-described examples.

Figure 7:
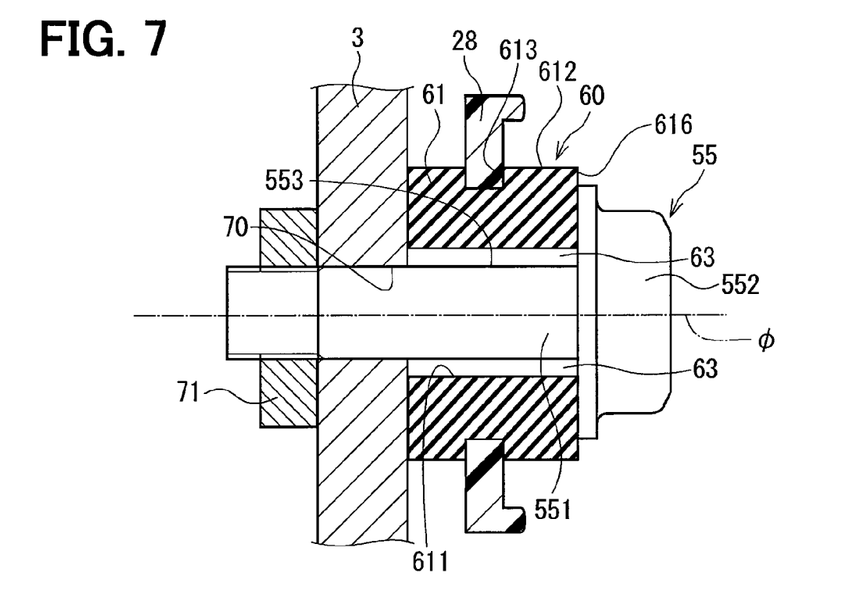
FIG. 7 is a sectional view showing a vibration insulating member according to another embodiment of the present disclosure.
Figure 8:
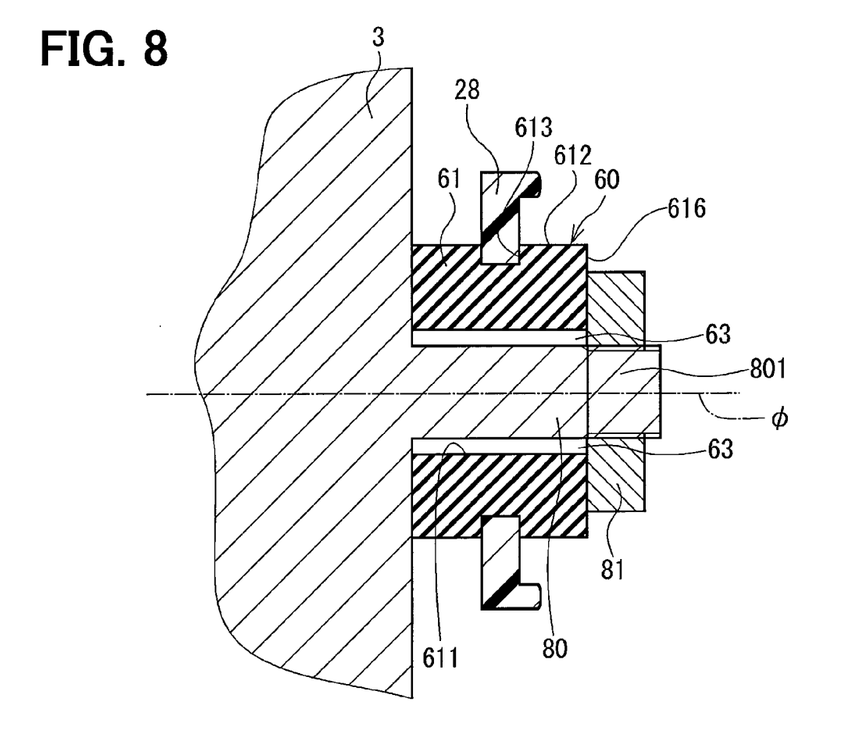
FIG. 8 is a sectional view showing a vibration insulating member according to another embodiment of the present disclosure different from the example of FIG. 7.

(VI) In the above embodiments, the tank sealing valve is mounted to the frame of the vehicle via the bolt, which is screwed to and combination with the frame of the vehicle. It is noted that, the configuration to connect the tank sealing valve with the frame of the vehicle is not limited to that in the above-described examples. FIG. 7 shows another example of the configuration. In FIG. 7, a through hole 70 is formed in the frame 3 of the vehicle. The shaft portion 551 of the bolt 55 is inserted in the through hole 611 of the grommet 60 and the through hole 70. A nut 71 is equipped on the opposite side of the frame 3 of the vehicle from the grommet 60. The nut 71 is used to connect the tank sealing valve 20 with the frame 3 of the vehicle. FIG. 8 shows another example of the configuration. In FIG. 8, a projection 80 is projected from the frame 3 of the vehicle to the outside of the frame 3. The projection 80 is inserted in the through hole 611 of the grommet 60. A thread groove is formed on an end 801 of the projection 80 on the opposite side of the frame 3. The thread groove of the end 801 is screwed to and connected with a nut 81 to connect the tank sealing valve 20 with the frame 3 of the vehicle.

(VII) In the above embodiments, the bolt is exemplified as the connection member to connect the tank sealing valve with the frame of the vehicle. It is noted that, the connection member is not limited to that in the above-described examples.

According to the present disclosure, the vibration insulating member is configured to be equipped between one component and the other component. The vibration insulating member includes the through hole forming portion and the contact portion. The through hole forming portion is formed of an elastic material. The through hole forming portion has the through hole configured to cause insertion of the connection member to connect the one component with the other component. The contact portion is formed to be projected radially inward from the inner wall of the through hole forming portion. When the connection member is inserted in the through hole, the outer wall of the connection member is configured to form a gap with the inner wall of the through hole forming portion and to make contact with the inner wall of the contact portion located on the radially inside of the contact portion.

For example, one component may be connected with another component via a connection member to equip a vibration insulating member between the one component and the other component. In such a configuration, in general, the vibration insulating member may elastically deform due to application of a connection force, which is caused by the connection member to connect the one component with the other component. In an assumable configuration, an elastic member is supposed to deform at a specific portion, and another component resides in a direction in which the specific portion is supposed to deform. In such an assumable configuration, the specific portion cannot elastically deform. Consequently, elastic property may decrease before mounting. Therefore, the elastic member is disabled to reduce propagation of vibration between the one component and the other component effectively. To the contrary, in the vibration insulating member according to the present disclosure, when the connection member is inserted in the through hole, the outer wall of the connection member is configured to be in contact with the inner wall of the contact portion and to form the gap with the inner wall of the through hole forming portion. When the vibration insulating member elastically deforms due to application of a connection force from the connection member, the contact portion, which is in contact with the outer wall of the connection member, is enabled to deform toward the gap. The present configuration enables to reduce decrease in the elastic property of the vibration insulating member, compared with an elastic member in which the inner wall of the through hole forming portion is in contact with the outer wall of the connection member. Therefore, the vibration insulating member according to the present disclosure is enabled to reduce propagation of vibration between the one component and the other component effectively.

In addition, the contact portion, which is projected radially inward from the inner wall of the through hole forming portion, is in contact with the outer wall of the connection member. Therefore, the position of the connection member can be aligned easily relative to the vibration insulating member. The present configuration enables to control the contact state of the connection member relative to the vibration insulating member. Therefore, the present configuration enables to reduce vibration steadily.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vibration insulating member configured to be equipped between one component and an other component, the vibration insulating member comprising:
  a through hole forming portion formed of an elastic material, the through hole forming portion having a through hole in which a connection member is configured to be inserted to connect the one component with the other component;
  at least one contact portion projected radially inward from an inner wall of the through hole forming portion, the at least one contact portion having an inner wall on its radially inside; and
  a collar formed of a material, which is higher in compressive strength than the elastic material of the at least one contact portion, wherein
  the collar includes a body and a seat portion,
  the body is in a tubular shape and configured to be located between an outer wall of the connection member and the inner wall of the through hole forming portion,
  the connection member is configured to be inserted in the body,
  the seat portion is equipped to one end of the body,
  the seat portion is configured to be in contact with the connection member and an end surface of the at least one contact portion, the end surface of the at least one contact portion being nonparallel to a center axis of the through hole,
  the seat portion is configured to receive a connection force, which the connection member exerts to connect the one component with the other component,
  when the connection member is inserted in the through hole, the outer wall of the connection member forms at least one gap with the inner wall of the through hole forming portion and is in contact with the inner wall of the at least one contact portion via the body, and
  a length of the body of the collar is shorter than a length of the through hole of the through hole forming portion in an axial direction.

2. The vibration insulating member according to claim 1, wherein
  the through hole forming portion has an outer wall on a radially outside, and
  the outer wall of the through hole forming portion defines a stationary groove to which an outer wall of the one component is configured to be fixed.

3. The vibration insulating member according to claim 1, wherein
  the through hole forming portion has one end surface and an other end surface, which are nonparallel with a center axis of the through hole, and
  the at least one contact portion extends from the one end surface to the other end surface.

4. The vibration insulating member according to claim 1, wherein
  the at least one gap has a sectional shape perpendicular to a center axis of the through hole, and
  the sectional shape is line-symmetrical about an imaginary line, which passes through a point on the center axis.

5. The vibration insulating member according to claim 1, wherein the at least one contact portion includes a plurality of contact portions.

6. The vibration insulating member according to claim 5, wherein
  the at least one gap includes a plurality of gaps, and
  the plurality of gaps are located on a concentric circle, which is centered at a point on a center axis of the through hole.

7. The vibration insulating member according to claim 6, wherein the plurality of gaps are located at constant angular intervals relative to the point on the center axis of the through hole.

8. The vibration insulating member according to claim 1, wherein the through hole forming portion and the at least one contact portion are integrally formed with each other.

9. The vibration insulating member according to claim 1, wherein
  the seat portion is formed in an annular shape,
  the seat portion is located at the one end of the body on an opposite side of the other component,
  the through hole forming portion has one end surface located on an opposite side of the other component,
  the seat portion has one end surface on a side of the through hole forming portion, and
  the one end surface of the seat portion is in contact with the one end surface of the through hole forming portion.

10. The vibration insulating member according to claim 9, wherein
  the seat portion has an other end surface on an opposite side of the through hole forming portion, and
  the other end surface of the seat portion is configured to be in contact with a head of the connection member.

11. The vibration insulating member according to claim 10, wherein
  the connection member is a bolt having the head.

12. The vibration insulating member according to claim 11, wherein
  the head has a head width in a direction perpendicular to the axial direction, the body of the collar has a body diameter in the direction perpendicular to the axial direction, and the head width is greater than the body diameter.

13. The vibration insulating member according to claim 1, wherein when the connection member is inserted in the through hole, an outer wall of the body forms the at least one gap with the inner wall of the through hole forming portion and is in contact with the inner wall of the at least one contact portion.

14. The vibration insulating member according to claim 13, wherein when the connection member is inserted in the through hole, the outer wall of the connection member makes contact with an inner wall of the body.

15. The vibration insulating member according to claim 1, wherein the connection member is configured to be screwed directly to the other component.

16. The vibration insulating member according to claim 1, wherein the through hole forming portion is configured to be directly in contact with the other component.

* * * * *